(12) United States Patent
Beech

(10) Patent No.: US 11,192,387 B2
(45) Date of Patent: Dec. 7, 2021

(54) CARD PRINTING USING THERMAL TRANSFER PRINT RIBBON WITH RADIATION CURABLE INK

(71) Applicant: Entrust Corporation, Shakopee, MN (US)

(72) Inventor: Brian Beech, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 16/923,524

(22) Filed: Jul. 8, 2020

(65) Prior Publication Data

US 2020/0338902 A1 Oct. 29, 2020

Related U.S. Application Data

(63) Continuation of application No. 15/865,681, filed on Jan. 9, 2018, now Pat. No. 10,889,129.
(Continued)

(51) Int. Cl.
*B41J 2/325* (2006.01)
*B41M 7/00* (2006.01)
(Continued)

(52) U.S. Cl.
CPC ............... *B41J 2/325* (2013.01); *B41J 3/407* (2013.01); *B41J 11/002* (2013.01); *B41J 13/12* (2013.01);
(Continued)

(58) Field of Classification Search
CPC . B41J 2/325; B41J 13/12; B41J 11/002; B41J 3/407; B41M 5/0047; B41M 7/0081; B41M 5/0064; B41M 7/009; B42D 25/318; B42D 25/23; B42D 25/328; B42D 25/309; G06K 19/06187; G06K 19/07; G06K 1/20
See application file for complete search history.

(56) References Cited

U.S. PATENT DOCUMENTS

| 4,825,054 A | 4/1989 | Rust et al. |
| 5,266,781 A | 11/1993 | Warwick et al. |

(Continued)

FOREIGN PATENT DOCUMENTS

| CN | 1314846 A | 9/2001 |
| CN | 203995148 U | 12/2014 |

(Continued)

OTHER PUBLICATIONS

Office Action, Chinese Patent Application No. 2018800136686, dated Jul. 1, 2020, with partial English translation (12 pages).
(Continued)

*Primary Examiner* — Justin Seo
(74) *Attorney, Agent, or Firm* — Hamre, Schumann, Mueller & Larson, P.C.

(57) ABSTRACT

A thermal transfer print ribbon having radiation curable ink thereon is used to print on a surface of a plastic card. The use of radiation curable thermal transfer printing to print on the card surface increases the durability of the printing compared to regular (i.e. non-radiation cured) thermal transfer printing once the radiation curable ink is cured. As a result, a protective laminate or coating need not be applied to the card surface to protect the printing.

12 Claims, 4 Drawing Sheets

Related U.S. Application Data

(60) Provisional application No. 62/444,550, filed on Jan. 10, 2017.

(51) Int. Cl.

| | | |
|---|---|---|
| B41J 3/407 | (2006.01) | |
| B42D 25/318 | (2014.01) | |
| G06K 19/06 | (2006.01) | |
| B42D 25/23 | (2014.01) | |
| B42D 25/328 | (2014.01) | |
| G06K 19/07 | (2006.01) | |
| B41J 11/00 | (2006.01) | |
| B41M 5/00 | (2006.01) | |
| B42D 25/309 | (2014.01) | |
| B41J 13/12 | (2006.01) | |
| G06K 1/20 | (2006.01) | |

(52) U.S. Cl.
CPC ........ *B41M 5/0047* (2013.01); *B41M 5/0064* (2013.01); *B41M 7/009* (2013.01); *B41M 7/0081* (2013.01); *B42D 25/23* (2014.10); *B42D 25/309* (2014.10); *B42D 25/318* (2014.10); *B42D 25/328* (2014.10); *G06K 1/20* (2013.01); *G06K 19/06187* (2013.01); *G06K 19/07* (2013.01)

(56) References Cited

U.S. PATENT DOCUMENTS

| | | | |
|---|---|---|---|
| 5,943,238 A | 8/1999 | Nioche et al. | |
| 6,476,840 B1 | 11/2002 | Taylor et al. | |
| 6,695,205 B1 | 2/2004 | Lundstrom et al. | |
| 6,783,067 B2 | 8/2004 | Kreuter et al. | |
| 6,850,263 B2 | 2/2005 | Taylor et al. | |
| 6,853,394 B2 | 2/2005 | Taylor et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 2001/0010535 A1 | 8/2001 | Andoh et al. | |
| 2003/0201317 A1* | 10/2003 | Shay | G06K 19/07716 235/375 |
| 2004/0012665 A1* | 1/2004 | Taylor | B41J 11/00214 347/213 |
| 2007/0097199 A1 | 5/2007 | Schmitt | |
| 2010/0128096 A1 | 5/2010 | Daniel et al. | |
| 2013/0220984 A1 | 8/2013 | Cronin et al. | |
| 2015/0085047 A1 | 3/2015 | Beech et al. | |
| 2017/0144476 A1* | 5/2017 | Postle | B41J 2/325 |
| 2017/0200074 A1 | 7/2017 | Beech et al. | |

FOREIGN PATENT DOCUMENTS

| | | |
|---|---|---|
| CN | 105579243 A | 5/2016 |
| CN | 106232374 A | 12/2016 |
| WO | 0209944 A1 | 2/2002 |

OTHER PUBLICATIONS

International Search Report and Written Opinion issued in PCT/US2018/012897, dated May 9, 2018, 15 pages.

\* cited by examiner

CARD PRINTING USING THERMAL TRANSFER PRINT RIBBON WITH RADIATION CURABLE INK

FIELD

This description relates to printing on surfaces of plastic or composite cards such as financial (e.g., credit, debit, or the like) cards, driver's licenses, national identification cards, business identification cards, gift cards, and other plastic or composite cards which bear personalized data unique to the cardholder and/or which bear other card information.

BACKGROUND

It is known to apply a protective laminate or coating to the front surface of a personalized plastic card to protect the printing on the front surface and extend the life of the plastic card. The back surface of the plastic card includes features such as a magnetic stripe, a signature panel and/or a hologram patch that cannot be overlaid with a protective laminate or coating since the protective laminate or coating would interfere with the operation or performance of the magnetic stripe, signature panel and/or a hologram patch. Therefore, if a protective laminate or coating is applied to the back surface, the protective laminate or coating only covers a portion of the back surface and does not cover the magnetic stripe, the signature panel and/or the hologram patch.

Printing on the surfaces of a plastic card using drop-on-demand (DOD) printing with ultra-violet (UV) curable ink is known. Once cured, the UV curable ink is more durable than conventional ink applied from a thermal transfer print ribbon.

SUMMARY

Apparatus, systems and methods are described where a thermal transfer print ribbon having radiation curable ink is used to print on a surface of a plastic or composite card such as a financial (e.g., credit, debit, or the like) card, driver's license, national identification card, business identification card, gift card, and other plastic or composite cards which bear personalized data unique to or assigned specifically to the cardholder and/or which bear other card information. The term "plastic card" as used herein is intended to encompass cards that are completely or substantially plastic, as well as cards that have non-plastic or composite components and cards having other formulations that function like the card types indicated above. Cards that are encompassed by the term "plastic cards" often bear printed personalized data unique to or assigned specifically to the cardholder, such as the name of the cardholder, an account number, an image of the face of the cardholder, and other data.

The use of radiation curable thermal transfer printing to print on the card surface increases the durability of the printing compared to regular (i.e. non-radiation curable) thermal transfer printing. As a result, a protective laminate or coating need not be applied to the card surface to protect the printing, in which case the card surface is devoid of (i.e. does not include) a protective laminate over the card surface. However, a protective laminate can optionally be used.

In one embodiment, the radiation curable thermal transfer printing is used to print on the back surface of the card. In another embodiment, the radiation curable thermal transfer printing is used to print on the front surface of the card, either in addition to or separate from any radiation curable thermal transfer printing on the back surface.

The radiation curable ink on the thermal transfer print ribbon can be pigment-based or dye-based. However, any type of radiation curable colorant material can be used as long as the radiation curable colorant material can be disposed on the thermal transfer print ribbon, can be thermally transferred from the ribbon to the card surface using a thermal printhead, and once transferred to the card surface can be cured by applying radiation to the colorant material. In one embodiment, the radiation curable ink can be cured by UV radiation. However, other types of radiation can be used as long as the radiation can adequately cure the applied radiation curable ink.

DRAWINGS

DETAILED DESCRIPTION

Figure 1B:
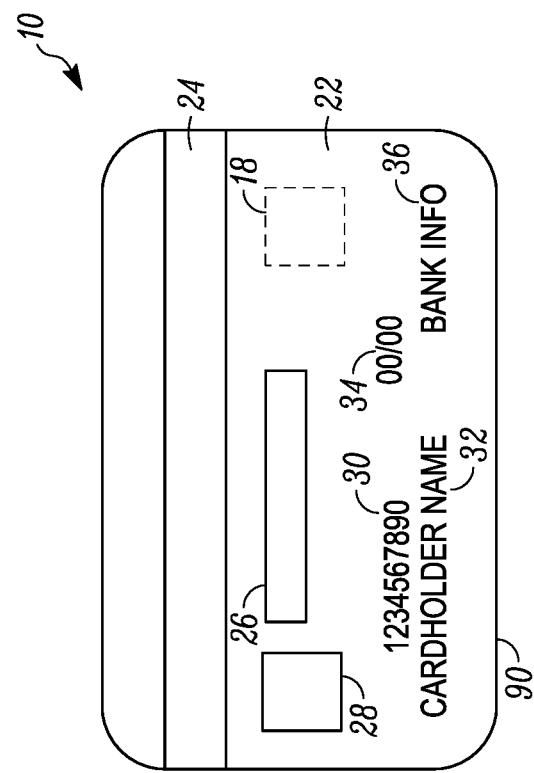
FIG. 1B illustrates an example of a back surface of the plastic card.

As described in further detail below, a thermal transfer print ribbon having radiation curable ink is used to print on a surface of a plastic or composite card such as a financial (e.g., credit, debit, or the like) card, driver's license, national identification card, business identification card, gift card, and other plastic or composite cards which bear personalized data unique to or assigned specifically to the cardholder and/or which bear other card information. In one embodiment, the radiation curable ink can be cured by exposing the ink to UV radiation. However, the radiation curable ink can be of a type that is cured by other forms of radiation. Examples of other forms of radiation that could be used can include, but are not limited to, microwave, x-ray, e-beam, visible light, infrared, and the like.

Examples of thermal transfer print ribbons with radiation curable inks are disclosed in U.S. Pat. Nos. 6,850,263, 6,853,394 and 6,476,840 each of which is incorporated by reference in its entirety.

The radiation curable ink on the thermal transfer print ribbon can be pigment-based or dye-based. However, any type of radiation curable colorant material can be used as long as the radiation curable colorant material can be disposed on the thermal transfer print ribbon, can be thermally transferred from the ribbon to the card surface using a thermal printhead, and once transferred to the card surface can be cured by applying radiation to the colorant material on the card surface.

The thermal transfer print ribbon can be a monochrome ribbon where the radiation curable ink can be a single color such as, but not limited to, black or white. In another embodiment, the thermal transfer print ribbon can be a multi-color ribbon with a repeating sequence of colored panels, such as a YMCK print ribbon, where the radiation curable ink can be yellow, magenta, cyan and black.

The term "plastic card" as used herein is intended to encompass cards that are completely or substantially plastic, as well as cards that have non-plastic or composite components and cards having other formulations that function like the card types indicated above. Cards that are encompassed by the term "plastic cards" often bear printed personalized data unique to or assigned specifically to the cardholder, such as the name of the cardholder, an account number, an image of the face of the cardholder, and other data.

In some embodiments, the concepts described herein can be used on plastic financial cards. A financial card, which may also be referred to as a credit card or a debit card, as used herein refers to a type of card that allows the cardholder to borrow funds or that has a stored monetary value. A financial card typically has at least a cardholder name and an account number provided thereon, often by printing. A financial card may also have an integrated circuit chip that stores data relating to the card and/or a magnetic stripe that stores data relating to the card.

The printing described herein can be performed in any suitable plastic card printing system that has one or more thermal transfer print stations each having a thermal printhead. In one embodiment, the thermal transfer print station (s), as well as the plastic card printing system as a whole, has a card throughput of at least about 1500 cards per hour.

One example of a suitable plastic card printing system that can be used is referred to as a central issuance card processing system that is typically designed for large volume batch processing of plastic cards, often employing multiple processing stations or modules to process multiple plastic cards at the same time to reduce the overall per card processing time. Examples of central issuance card processing systems include the MX and MPR family of central issuance systems available from Entrust Datacard Corporation of Shakopee, Minn. Other examples of central issuance systems are disclosed in U.S. Pat. Nos. 4,825,054, 5,266,781, 6,783,067, and 6,902,107, all of which are incorporated herein by reference in their entirety.

Another example of a suitable plastic card printing system that can be used is referred to as a desktop card processing system that is typically designed for relatively small scale, individual plastic card processing. In desktop processing systems, a single plastic card to be processed is input into the system, processed, and then output. These systems are often termed desktop machines or desktop printers because they have a relatively small footprint intended to permit the machine to reside on a desktop. Many examples of desktop machines are known, such as the SD or CD family of desktop card machines available from Entrust Datacard Corporation of Shakopee, Minn. Other examples of desktop card machines are disclosed in U.S. Pat. Nos. 7,434,728 and 7,398,972, each of which is incorporated herein by reference in its entirety.

Figure 1A:
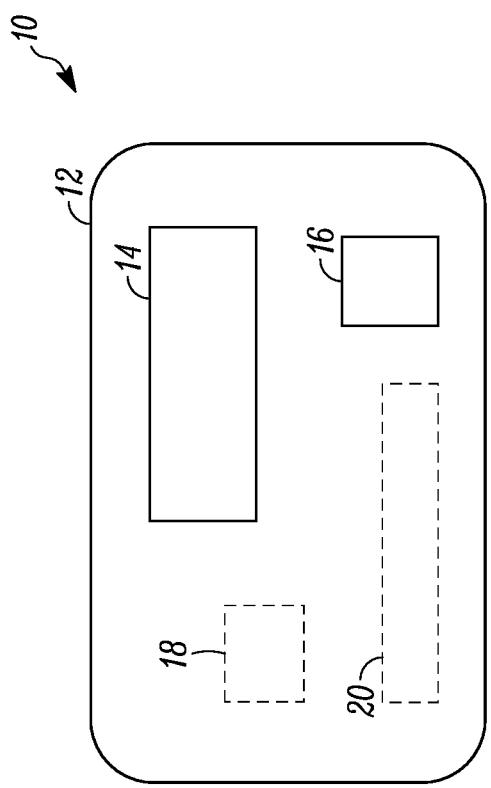
FIG. 1A illustrates an example of a front surface of a plastic card.

Referring initially to FIG. 1A, an example plastic card 10 having a front surface 12 is illustrated. Many possible layouts for the front surface 12 are possible. For example, the front surface 12 can include account information, a horizontal card layout, a vertical card layout, and other known layout configurations and orientations.

In the illustrated example in FIG. 1A, the front surface 12 can include first printed data 14 and second printed data 16. The first printed data 14 can include information on the entity that issued the card 10, such as the corporate name and/or logo of the issuing bank (for example, STATE BANK) or the card brand name (for example, VISA®, MASTERCARD®, DISCOVER®, etc.). The second printed data 16 can be, for example, the card brand name (for example, VISA®, MASTERCARD®, DISCOVER®, etc.). The front surface 12 may also include a contact or contactless integrated circuit chip 18 that can store various data relating to the card 10 such as an account number or name of the cardholder. In addition, the front surface 12 may also optionally include printed or embossed cardholder data 20 such as the cardholder name and/or an account information such as account number, expiration date and the like.

Referring to FIG. 1B, an example of a back surface 22 of the plastic card 10 is illustrated. Many possible layouts for the back surface 22 are possible which may or may not have a similar layout as the front surface 12. For example, the back surface 22 can include account information, a horizontal card layout, a vertical card layout, and other known layout configurations and orientations.

In the illustrated example in FIG. 1B, the back surface 22 can include a magnetic strip 24 that stores various data relating to the card 10 such as an account number or name of the cardholder, a signature panel 26 that provides a place for the cardholder to sign their name, and a hologram 28. The magnetic strip 24, the signature panel 26, and the hologram 28 are conventional elements found on many plastic cards.

The back surface 22 can also include printed personal data that is unique to or assigned specifically to the cardholder. For example, an account number 30 assigned to the cardholder, the name of the cardholder 32, and a card expiration date 34 can be printed on the back surface 22. Other personal cardholder data may also be printed on the back surface 22, such as an image of the face of the cardholder. Non-personal data 36 such as name of the issuing bank, contact information to contact the issuing bank, and the like, can also be printed on the back surface 22.

Referring to FIG. 1B, the printing 30, 32, 34 can be located on the back surface 22 at a position between the magnetic stripe 24 and a bottom edge 90 of the plastic card 10. The printing 30, 32, 34 may also be characterized as being located between the signature panel 26 and the bottom edge 90 of the plastic card 10, as well as characterized as being located on the back surface 22 at a position so that the signature panel 26 is disposed between the magnetic stripe 24 and the radiation cured ink forming the printing 30, 32, 34.

The printed data 30, 32, 34, 36 on the back surface 22 and/or the printed data 14, 16, 20 on the front surface 12 is printed using a radiation curable ink applied from a thermal transfer print ribbon. Once the data is printed and the radiation curable ink is cured using suitable radiation such as UV radiation, the printed data has superior abrasion resistance compared to data that is printed using standard (i.e. non-radiation curable) ink from a thermal transfer ribbon. The abrasion resistance is sufficient to permit the plastic card 10 to be issued to the cardholder without a protective laminate or coating applied to the back surface 22 and/or to the front surface 12. In other words, the back surface 22 and/or the front surface 12 can be without or devoid of a protective laminate or coating overlaying the printed data.

In one embodiment, the printed data printed using the radiation curable ink has an abrasion resistance value of at least about 400 cycles which abrasion resistance value is suitable for plastic cards such as financial cards. In another embodiment, the printed data printed using the radiation curable ink has an abrasion resistance value of between about 600-800 cycles. In still another embodiment, the printed data printed using the radiation curable ink has an abrasion resistance value of about 800 cycles. All abrasion resistance values disclosed herein are measured by the American National Standards For Information Technology, INCITS 322: 201x, Card Durability Test Methods (Revision of INCITS 322:2008), Section 5.11, August 2014.

Figure 2:
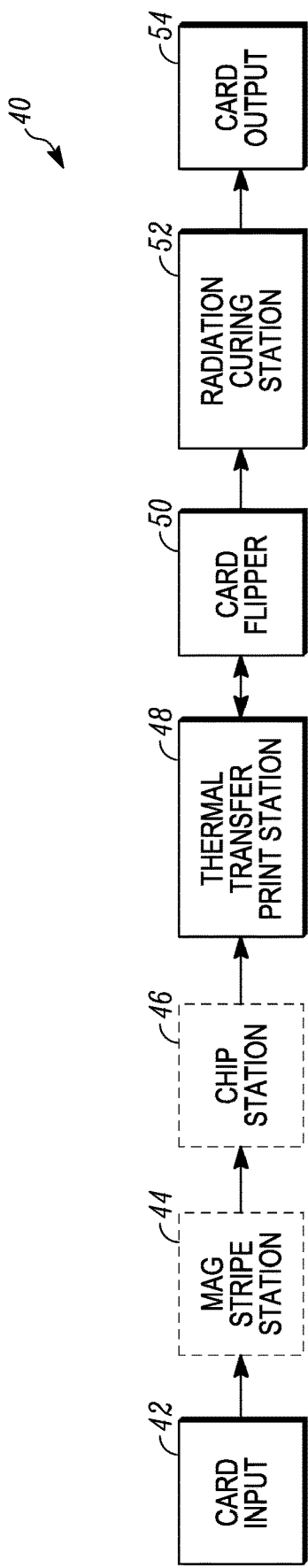
FIG. 2 is a schematic illustration of one embodiment of a plastic card printing system described herein.

FIG. 2 illustrates an example of one embodiment of a plastic card printing system 40 that can be used to print on and optionally additionally process the plastic card 10. In this example, the system 40 can include a card input 42, an optional magnetic stripe station 44, an optional integrated circuit chip station 46, a thermal transfer print station 48, a card flipper 50 (or card reorienting mechanism), a radiation curing station 52, and a card output 54. As discussed above, the elements 42-54 in the system 40 can be part of a central issuance card processing system or part of a desktop card processing system. The elements 42-54 can be separate stations or modules, or the functionalities of one or more of the elements 42-54 can be combined into what may be considered a common station or module with the other elements.

The card input 42 can be a card input hopper designed to hold a plurality of cards waiting to be fed on-by-one into the system 40 for processing. An example of a card input hopper is described in U.S. Pat. No. 6,902,107 which is incorporated herein by reference in its entirety. Alternatively, the card input 42 can be an input slot through which individual cards are fed one-by-one into the system 40.

The magnetic stripe station 44 is optional. If present, the magnetic stripe station 44 can verify the operation of the magnetic stripe 24 on the back surface 22 of the card 10 and/or program the magnetic stripe 24 with data. An example of a magnetic stripe station is described in U.S. Pat. No. 6,902,107 which is incorporated herein by reference in its entirety.

The integrated circuit chip station 46 is also optional, and if present, is designed to verify the operation of the chip 18 on the card 10 and/or program the chip 18 with data. The chip station 46 can include a single chip programming station for programming a single card at a time within the station 46, or the station 46 can be configured to simultaneously program multiple cards. A chip station having simultaneous, multiple card programming is described in U.S. Pat. No. 6,695,205 (linear cassette configuration) and in U.S. Pat. No. 5,943,238 (barrel configuration) each of which is incorporated herein by reference in its entirety.

The magnetic stripe station 44 and the integrated circuit chip station 46 can be located anywhere in the system 40 between the input 42 and the output 54. The example in FIG. 2 illustrates the magnetic stripe station 44 and the integrated circuit chip station 46 between the input 42 and the thermal transfer print station 48 since if it is determined in the stations 44, 46 that the magnetic stripe 24 and/or the chip 18 are not functioning correctly, then the plastic card 10 can be immediately directed to a reject location since further processing on the defective plastic card 10 is not necessary.

Figure 5:
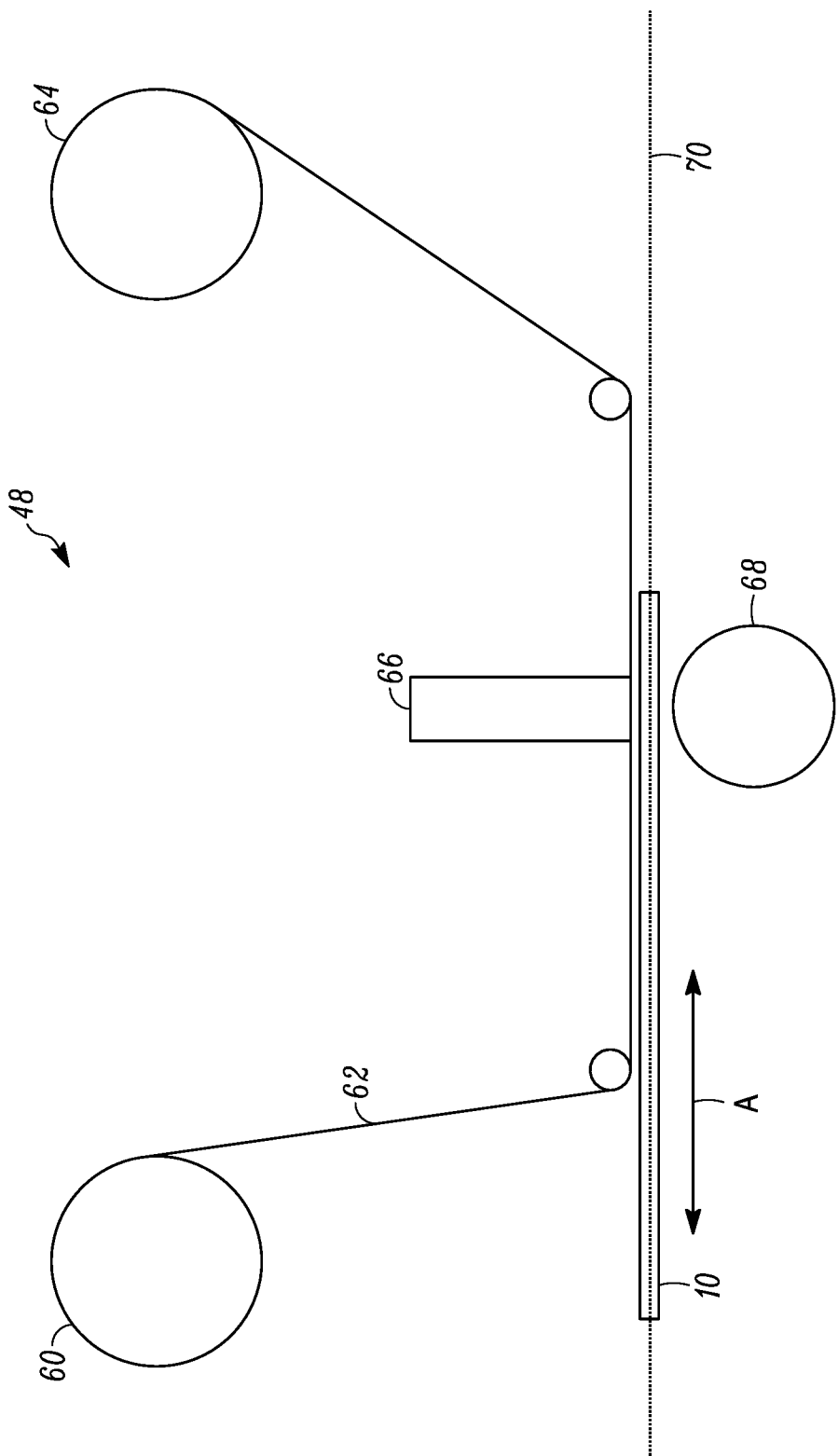
FIG. 5 is a schematic illustration of an embodiment of a thermal transfer print station described herein.

The thermal transfer print station 48 is configured to apply the radiation curable ink from a thermal transfer print ribbon onto a surface of the plastic card 10 using thermal transfer printing. An example of the thermal transfer print station 48 is illustrated in FIG. 5. The thermal transfer print station 48 includes a ribbon supply 60 that supplies a thermal transfer print ribbon 62 having radiation curable ink, and a ribbon take-up 64 that takes-up used portions of the thermal transfer print ribbon after printing. The print ribbon 62 is transferred along a ribbon path between the ribbon supply 60 and the ribbon take-up 64 past a thermal printhead 66 that can be moved toward and away from an opposing fixed platen 68 to sandwich the print ribbon 62 and the card 10 therebetween during printing. Alternatively, the platen 68 can be movable toward and away from the printhead 66 which can be stationary. The card 10 can be transported in both forward and reverse directions (as indicated by the arrow A) along a transport path 70 through the print station 48 using conventional card transport mechanisms such as transport rollers. The general construction and operation of thermal transfer print stations is well known in the art.

Returning to FIG. 2, the card flipper 50 is configured to flip the card 10 180 degrees so that a surface thereof previously facing upward now faces downward and vice versa. Card flippers are well known in the art. Examples of suitable card flippers are described in U.S. 2013/0220984 and U.S. Pat. No. 7,398,972 each of which is incorporated herein by reference in its entirety. In this example, the card flipper 50 is disposed between the print station 48 and the radiation curing station 52. This permits one side of the card 10 to be printed on, the card 10 can then be flipped in the card flipper 50 and returned to the print station 48 to print on the opposite side of the card, and then the card can be fed to the radiation curing station 52 to cure both sides of the card. Alternatively, the card can be transported to the curing station 52 after printing on the one side of the card to cure the one side, then the card can be fed back into the flipper 50 to flip the card 10 for printing on the opposite side of the card 10 followed by curing of the opposite side in the curing station 52.

The radiation curing station 52 is configured to cure the radiation curable ink applied to the card surface(s) in the print station 48. In one embodiment, the curing station 52 cures the ink using UV radiation from one or more UV lights. The UV lights can be lamps or light emitting diodes. The curing station 52 can be the same as the UV curing stations used in drop-on-demand card printing using UV ink, or the curing station 52 can be different from the UV curing stations used in drop-on-demand card printing using UV ink. An example of a UV curing station that could be used is the UV curing utilized in the MJ7500 Card Personalization System available from Entrust Datacard Corporation of Shakopee, Minn., or the UV curing used in the CardGard™ UV-curing topcoat module available from Entrust Datacard Corporation of Shakopee, Minn.

The card output 54 can be a card output hopper designed to hold a plurality of processed cards that are output one-by-one after being processed within the system 40. An example of a card output hopper is described in U.S. Pat. No. 6,902,107 which is incorporated herein by reference in its entirety. Alternatively, the card output 54 can be an output slot through which individual cards are output one-by-one. In the case of central issuance card processing systems, the card output 54 can be the last element in the system 40 and located at the downstream end of the system 40. In the case of desktop card processing systems, the card output 54 can be located at the downstream end of the system 40 in some systems, or even located at the same end of the system 40 as the card input 42.

Figure 3:
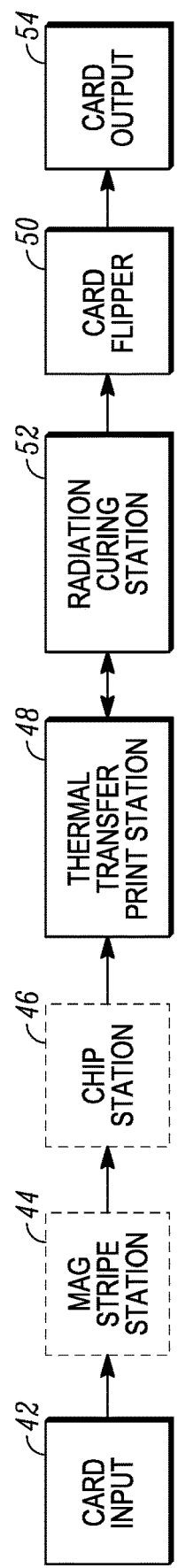
FIG. 3 is a schematic illustration of another embodiment of a plastic card printing system described herein.

Many configurations of the system 40 are possible. For example, FIG. 3 illustrates a system 40' that is similar to the system 40 with like elements referenced using the same reference numerals. In the system 40', the positions of the card flipper 50 and the curing station 52 are switched so that the curing station 52 is between the print station 48 and the card flipper 50.

The systems 40, 40' can include additional stations not illustrated in FIGS. 2 and 3. Examples of additional stations that can be included in the systems 40, 40' can include, but are not limited to, an embossing station, a graphics printing station, an indent print station, a laser marking station, and other processing stations that are well known in the art of card processing. In embodiments where a laminate or coating does not overlay the printed data, the systems 40, 40' can be devoid of a mechanism for applying a laminate or coating to the front surface 12 or the back surface 22, or a mechanism for applying a laminate or coating can be present in the systems 40, 40' but the card can be transported past the mechanism without an overlaying laminate or coating being applied.

Figure 4:
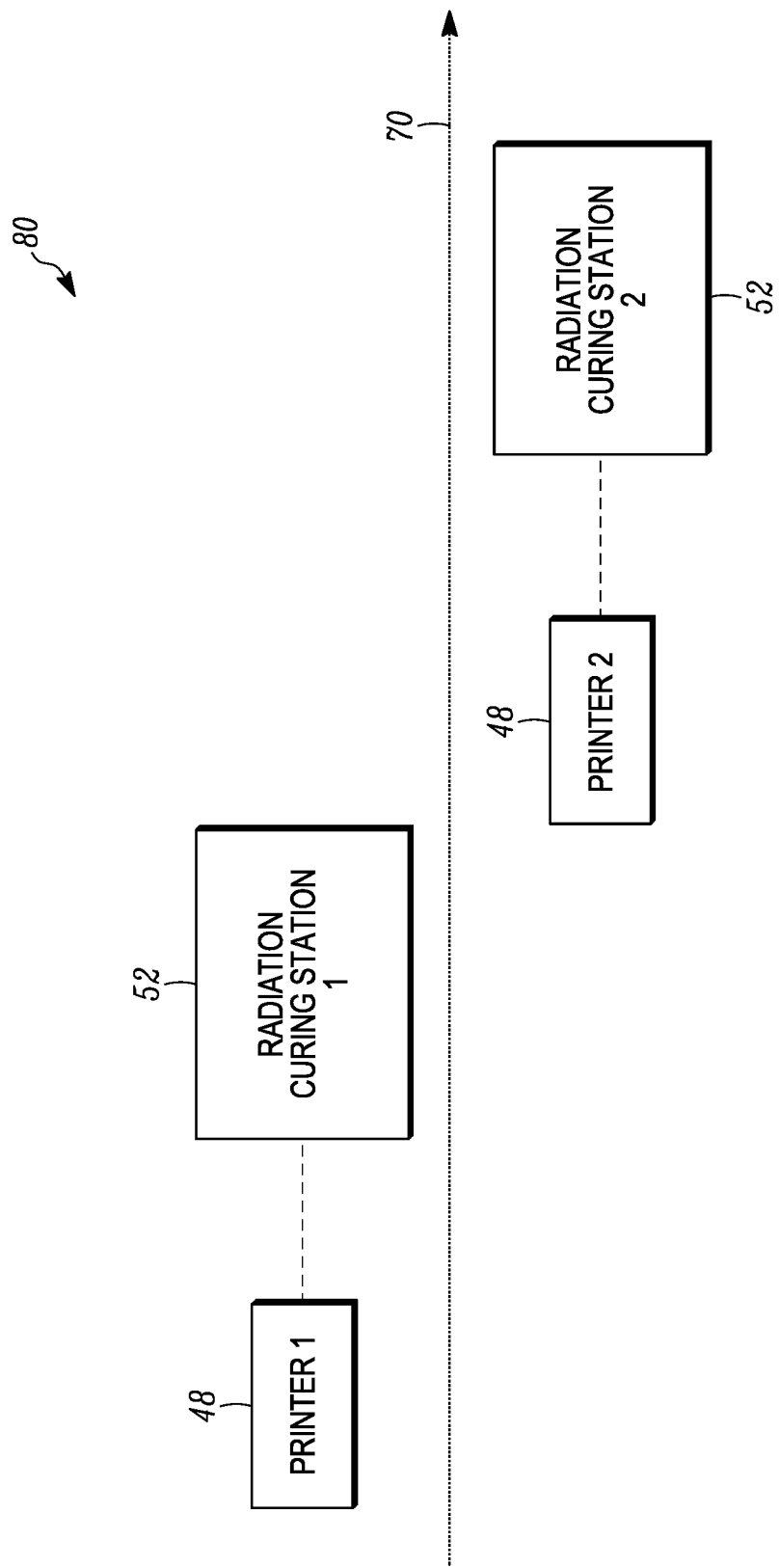
FIG. 4 is a schematic illustration of still another embodiment of a portion of a plastic card printing system described herein.

FIG. 4 illustrates a portion of a system 80 that avoids the need for the card flipper 50. The system 80 includes a first one of the print stations 48 and a first one of the radiation curing stations 52 on a first side of the card transport path 70, and a second one of the print stations 48 and a second one of the radiation curing stations 52 on a second, opposite side of the card transport path 70. In this embodiment, the first print station 48 can print on one side of the card, followed by curing of the radiation curable ink in the first curing station 52. The second print station 48 can then print on the opposite side of the card, followed by curing of the radiation curable ink in the second curing station 52. As a result, the card can be printed on both surfaces in a single pass of the card without reversing direction of travel of the card along the card transport path 70 and without flipping the card in a card flipper. The second print station 48 and the second radiation curing station 52 can be disposed between the first print station 48 and the card output 54.

In operation of the systems described herein, a plastic card having a front surface and a back surface is input and directed into the thermal transfer print station 48. The print station 48 prints onto one of the surfaces, such as the back surface, of the card by transferring a portion of the radiation curable ink from the thermal transfer print ribbon onto the surface using the thermal printhead. After printing onto the surface, the card is mechanically transported using a card transport mechanism into a radiation curing station, and radiation is applied to the surface in the radiation curing station to cure the radiation curable ink on the surface. If printing on the opposite surface is desired, the card can be flipped and transported back to the print station to transfer a portion of the radiation curable ink from the thermal transfer print ribbon onto the surface using the thermal printhead, followed by curing of the printed radiation curable ink on the opposite side as disclosed in FIGS. 2 and 3, or printing can occur using a second print station as described in FIG. 4.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A desktop plastic card printing system, comprising:
   a card input hopper configured to hold a plurality of plastic financial cards to be printed, each plastic financial card having an integrated circuit chip and/or a magnetic stripe;
   a plastic card output configured to hold a plurality of the plastic financial cards after printing;
   a thermal transfer print station downstream from the card input hopper, the thermal transfer print station includes a thermal transfer print ribbon having radiation curable ink, a ribbon supply that supplies the thermal transfer print ribbon, and a ribbon take-up that takes-up used portions of the thermal transfer print ribbon;
   a radiation curing station downstream from the card input hopper, the radiation curing station includes one or more light emitting diodes that emit radiation to cure radiation curable ink applied to a plastic financial card; and
   wherein the radiation cured ink on the plastic financial card has an abrasion resistance of at least 400 cycles.

2. The desktop plastic card printing system of claim 1, wherein the abrasion resistance value is between about 600 cycles to about 800 cycles.

3. The desktop plastic card printing system of claim 1, further comprising a card flipper.

4. The desktop plastic card printing system of claim 1, further comprising a magnetic stripe station downstream from the card input hopper.

5. The desktop plastic card printing system of claim 1, further comprising an integrated circuit chip station downstream from the card input hopper.

6. A plastic financial card produced using the desktop plastic card printing system of claim 1.

7. A plastic card printing system, comprising:
   a plastic card input and a plastic card output;
   a thermal transfer print station that prints on a plastic card that has been input from the plastic card input, the thermal transfer print station includes a thermal transfer print ribbon having radiation curable ink, a ribbon supply that supplies the thermal transfer print ribbon, and a ribbon take-up that takes-up used portions of the thermal transfer print ribbon;
   a radiation curing station that includes one or more ultraviolet lights that emit ultraviolet radiation to cure radiation curable ink that has been applied from the thermal transfer print ribbon to a surface of the plastic card;
   wherein the radiation cured ink on the surface provides an abrasion resistance that is sufficient to permit the plastic card to be issued to a cardholder without a protective laminate or coating overlaying the radiation cured ink on the surface; and
   wherein the radiation cured ink on the plastic card has an abrasion resistance of at least 400 cycles.

8. The plastic card printing system of claim 7, wherein the abrasion resistance value is between about 600 cycles to about 800 cycles.

9. The plastic card printing system of claim 7, further comprising a card flipper.

10. The plastic card printing system of claim 7, further comprising a magnetic stripe station downstream from the plastic card input.

11. The plastic card printing system of claim 7, further comprising an integrated circuit chip station downstream from the plastic card input.

12. A plastic card produced using the plastic card printing system of claim 7.

* * * * *